US008818132B2

(12) United States Patent
Zhang et al.

(10) Patent No.: US 8,818,132 B2
(45) Date of Patent: *Aug. 26, 2014

(54) CAMERA CALIBRATION WITH LENS DISTORTION FROM LOW-RANK TEXTURES

(75) Inventors: Zhengdong Zhang, Beijing (CN); Yasuyuki Matsushita, Beijing (CN); Yi Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/310,729

(22) Filed: Dec. 3, 2011

(65) Prior Publication Data

US 2012/0133780 A1    May 31, 2012

Related U.S. Application Data

(63) Continuation-in-part of application No. 12/955,734, filed on Nov. 29, 2010, now Pat. No. 8,463,073.

(51) Int. Cl.
*G06K 9/36* (2006.01)
*G06T 7/00* (2006.01)

(52) U.S. Cl.
CPC .................. *G06T 7/0018* (2013.01)
USPC ......................... 382/289; 382/154

(58) Field of Classification Search
CPC ................................................... G06T 7/0018
See application file for complete search history.

(56) References Cited

U.S. PATENT DOCUMENTS

| | | | |
|---|---|---|---|
| 6,519,362 B1 | 2/2003 | Cusmariu | |
| 7,050,085 B1 * | 5/2006 | Park et al. | 348/36 |
| 8,463,073 B2 * | 6/2013 | Ma et al. | 382/289 |
| 2003/0076980 A1 * | 4/2003 | Zhang et al. | 382/103 |
| 2005/0128197 A1 | 6/2005 | Thrun et al. | |
| 2005/0285872 A1 | 12/2005 | Wang et al. | |
| 2008/0158362 A1 | 7/2008 | Butterworth | |
| 2009/0016606 A1 | 1/2009 | Meyer et al. | |
| 2009/0046932 A1 | 2/2009 | Francos et al. | |
| 2009/0323818 A1 | 12/2009 | Weiss et al. | |
| 2010/0295948 A1 | 11/2010 | Xie et al. | |
| 2011/0064302 A1 | 3/2011 | Ma et al. | |
| 2011/0311121 A1 | 12/2011 | Zhang et al. | |

OTHER PUBLICATIONS

Zhang, Zhengyou. "A flexible new technique for camera calibration." Pattern Analysis and Machine Intelligence, IEEE Transactions on 22.11 (2000): 1330-1334.*

(Continued)

*Primary Examiner* — Bhavesh Mehta
*Assistant Examiner* — Andrew Moyer
(74) *Attorney, Agent, or Firm* — Carole Boelitz; Micky Minhas

(57) ABSTRACT

A "Camera Calibrator" provides various techniques for recovering intrinsic camera parameters and distortion characteristics by processing a set of one or more input images. These techniques are based on extracting "Transform Invariant Low-Rank Textures" (TILT) from input images using high-dimensional convex optimization tools for matrix rank minimization and sparse signal recovery. The Camera Calibrator provides a simple, accurate, and flexible method to calibrate intrinsic parameters of a camera even with significant lens distortion, noise, errors, partial occlusions, illumination and viewpoint change, etc. Distortions caused by the camera can then be automatically corrected or removed from images. Calibration is achieved under a wide range of practical scenarios, including using multiple images of a known pattern, multiple images of an unknown pattern, single or multiple images of multiple patterns, etc. Significantly, calibration is achieved without extracting or manually identifying low-level features such as corners or edges from the calibration images.

20 Claims, 5 Drawing Sheets

(56) References Cited

OTHER PUBLICATIONS

Sturm, Peter F., and Stephen J. Maybank. "On plane-based camera calibration: A general algorithm, singularities, applications." Computer Vision and Pattern Recognition, 1999. IEEE Computer Society Conference on.. vol. 1. IEEE, 1999.*
Zhang et al., "TILT: Transform Invariant Low-rank Textures," arXiv:1012.3216, posted on arxiv.org on Dec. 15, 2010.*
Tordoff, Ben, and David W. Murray. "Violating rotating camera geometry: The effect of radial distortion on self-calibration." Pattern Recognition, 2000. Proceedings. 15th International Conference on. vol. 1. IEEE, 2000.*
Huang, J., X. Huang, D. N. Metaxas, Simultaneous image transformation and sparse representation recovery, IEEE Comp. Soc. Conf. on Comp. Vision and Pattern Recognition, CVPR 2008, Jun. 24-26, 2008, pp. 1-8, Anchorage, Alaska, USA.
Yang, J., J. Wright, T. S. Huang, Y. Ma, Image super-resolution as sparse representation of raw image patches, IEEE Comp. Soc. Conf. on Comp. Vision and Pattern Recognition, CVPR 2008, Jun. 24-26, 2008, pp. 1-8, Anchorage, Alaska, USA.
Moyer, A., Notice of Allowance, U.S. Appl. No. 12/955,734, Feb. 13, 2013.
Koo, H. i., N. I. Cho, Rectification of figures and photos in document images using bounding box interface, The Twenty-Third IEEE Conf. on Comp. Vision and Pattern Recognition, CVPR 2010, Jun. 13-18, 2010, pp. 3121-3128, San Francisco, CA, USA.
Capel, D. P., A. Zisserman, Automated mosaicing with super-resolution zoom, 1998 Conf. on Comp. Vision and Pattern Recognition, CVPR 1998, Jun. 23-25, 1998, pp. 885-891, Santa Barbara, CA, USA.
Hartley, R. I., Self-calibration from multiple views with a rotating camera, Proc. of the Third European Conf. on Comp. Vision, May 2-6, 1994, pp. 471-478, vol. 1, Stockholm, Sweden.
Moyer, Andrew M, Office Action, U.S. Appl. No. 12/955,734, Sep. 27, 2012.
Pollefeys, et al., "Self-Calibration and Metric Reconstruction in spite of Varying and Unknown Intrinsic Camera Parameters", International Journal of Computer Vision, vol. 32, No. 1, 1998, pp. 1-18.
Brauer-Burchardt, et al., "A new algorithm to correct fish-eye- and strong wide-angle-lens-distortion from single images", International Conference on Image Processing, vol. 1, 2001, pp. 225-228.
Wang, et al., "A New Calibration Model and Method of Camera Lens Distortion", International Conference on Intelligent Robots and Systems (IEEE/RSJ), Sep. 9-15, 2006, pp. 5713-5718.
Xu, et al., "Accurate Camera Calibration with New Minimizing Function", IEEE, International Conference on Robotics and Biomimetics (ROBIO), Dec. 17-20, 2006, pp. 779-784.
Gao, et al., "A multistage camera self-calibration algorithm", IEEE International Conference on Acoustics, Speech, and Signal Processing (ICASSP), May 17-21, 2004, pp. 537-540.
Jean-Yves Bouguet. Camera Calibration Toolbox for Matlab, Caltech, Jul. 9, 2010, pp. 52.
D.C. Brown. Close-Range Camera Calibration. Photogrammetric Engineering, vol. 37(8), pp. 855-866, 1971.
R. Cipolla and T. Drummond and D.P. Robertson. Camera Calibration from Vanishing Points in Images of Architectural Scenes. BMVC, pp. 382-391, 1999.
F. Devernay and O. D. Faugeras. Automatic Calibration and Removal of Distortion from Scenes of Structured Environments. SPIE Conference on Investigative and Trial Image Processing, pp. 62-72, 1995.
O. Faugeras. Three-Dimensional Computer Vision: A Geometric Viewpoint. MIT Press, 1993.
L. Grammatikopoulos and G. Karras and E. Petsa and I. Kalisperakis. A Unified Approach for Automatic Camera Calibration from Vanishing Points. International Archives of the Photogrammetry, Remote Sensing & Spatial Information Sciences, XXXVI(5), 2006.
D. Liebowitz and A. Zisserman. Metric Rectification for Perspective Images of Planes. CVPR, pp. 482-488, 1998.
Y. Peng and A. Ganesh and J. Wright and W. Xu and Y. Ma. RASL: Robust Alignment by Sparse and Low-Rank Decomposition for Linearly Correlated Images. CVPR, 2010.
P. Sturm and S. J. Maybank. A Method for Interactive 3D Reconstruction of Piecewise Planar Objects from Single Images. In BMVC, 1999.
R.Y. Tsai. A Versatile Camera Calibration Technique for High-Accuracy 3D Machine Vision Metrology Using Off-the-Shelf TV Cameras and Lenses. IEEE Journal of Robotics and Automation, 3(4):323-344, 1987.
Zhengyou Zhang. Camera Calibration with One-Dimensional Objects. PAMI, 26(7):892-899, 2004.
Zhengyou Zhang. Flexible Camera Calibration by Viewing a Plane from Unknown Orientations. ICCV, 1999.
W. Faig. Calibration of Close-range Photogrammetry Systems: Mathematical Formulation. Photogrammetric Engineering and Remote Sensing, vol. 41(12), pp. 1479-1486, 1975.
B. Caprile and V. Torre. Using Vanishing Points for Camera Calibration. IJCV, vol. 4(2), pp. 127-140, 1990.
O.D. Faugeras and Q.T. Luong and S.J. Maybank. Camera Self-calibration: Theory and Experiments. ECCV, pp. 321-334, 1992.
S.J. Maybank and O. Faugeras. A Theory of Self-Calibration of a Moving Camera. IJCV, vol. 8(2), pp. 123-152, 1992.
Grother, P. J., NIST Special Database 19, Handprinted Forms and Characters Database, Mar. 16, 1995, pp. 1-28.
Jung, K., K. L. Kim, A. K. Jain, Text information extraction in images and video: A survey, Pattern Recognition, May 2004, vol. 37, No. 5, pp. 977-997.
Peng, Y., A. Ganesh, J. Wright, W. Xu, Y. Ma, RASL: Robust alignment by sparse and low-rank decomposition for linearly correlated images, 2010 IEEE Conference on Computer Vision and Pattern Recognition (CVPR), Jun. 2010, pp. 763-770, San Francisco, CA.
Moyer, Andrew M., U.S. Office Action, U.S. Appl. No. 13/310,730, Sep. 11, 2013, pp. 18.

* cited by examiner

Example of Selection of an Input Window or Region in a Skewed and Transformed Image of a Regular Geometric Structure

CAMERA CALIBRATION WITH LENS DISTORTION FROM LOW-RANK TEXTURES

CROSS-REFERENCE TO RELATED APPLICATIONS

This application is a continuation-in-part of U.S. patent application Ser. No. 12/955,734, filed on Nov. 29, 2010, by Yi Ma, et al., and entitled "ROBUST RECOVERY OF TRANSFORM INVARIANT LOW-RANK TEXTURES," the subject matter of which is incorporated herein by this reference.

BACKGROUND

1. Technical Field

A "Camera Calibrator" provides various techniques for automatically and accurately recovering intrinsic and extrinsic camera parameters and lens distortion characteristics based on a process that extracts "Transform Invariant Low-Rank Textures" (TILT) from a set of one or more input images without requiring the use of low-level feature extraction techniques or manual labeling of specific points, corners or edges in the input images used for calibration purposes.

2. Background Art

A variety of camera calibration techniques are widely used in computer vision and photogrammetry systems. Such techniques are typically used for each newly produced camera wherein each camera or associated equipment is used to perform a calibration process to correct its inherent radial distortion and intrinsic parameters. Further, such techniques are also often among the first steps in performing many applications in computer vision, such as reconstructing 3D structures from multiple images, determining structure from motion, performing photometric stereo processes, structured lighting applications, etc.

Existing camera calibration techniques have provided with many choices to solve this problem in different settings. However, it is believed that such techniques typically rely on extraction of certain local features first, such as corners, edges, and SIFT features (i.e., "scale invariant feature transforms"). These extracted local features are then assembled to establish correspondences, calculate vanishing points, infer lines or conic curves for calibration, etc. As is well known to those skilled in the art, it is generally difficult to accurately and reliably extract all wanted features in many images in the presence of noise, occlusion, image blur, and change of illumination and viewpoint.

For example, images used for camera calibration purposes that contain large amounts of noise, outliers, missing features, mismatches, etc., can result in invalid camera calibration results. Consequently, many of the most reliable techniques for obtaining accurate camera calibration and distortion parameters rely on manually labeling the precise location of points in multiple images of a pre-designed pattern (such as a chessboard pattern, for example). Unfortunately, not only does the use of a pre-designed pattern limit the use of such methods to restricted or laboratory type conditions, but also the careful manual input used by such techniques makes camera calibration a time-consuming task.

One widely adopted class of conventional camera calibration techniques use specially designed calibration objects that have explicitly known geometric information. These calibration objects include 3D objects, 2D planes, and 1D line targets. By observing these targets from different viewpoints, these conventional techniques recover the cameras intrinsic parameters. For example, 3D calibration objects typically consist of two or three planes orthogonal to each other. Conventional techniques using such 3D objects generally provide the most accurate calibration with a simple algorithm. Unfortunately, the setup used by such techniques is generally rather complicated and expensive. 2D plane-based calibration techniques generally require observing a planar pattern from multiple different viewpoints in order to provide accurate calibration results. Finally, 1D line-based calibration techniques generally use a set of collinear points with known distances. Because such techniques are useful for addressing occlusion problems, they are often used for multi-camera calibration scenarios.

In contrast to the techniques summarized above, conventional camera self-calibration techniques avoid the use of known calibration patterns by attempting to calibrate a camera by finding intrinsic parameters that are consistent with the geometry of a given set of images. In general, finding a sufficient number of point correspondences among three images is typically sufficient to recover both intrinsic and extrinsic parameters for the camera. However, because this type of self-calibration relies on point correspondences across images, it is necessary for these approaches to extract accurate feature point locations. Further, such techniques do not generally adequately handle lens distortion of the camera.

Camera calibration based on vanishing points represents yet another class of calibration techniques. Such approaches generally utilize parallelism and orthogonality among lines in a 3D space. For example, certain camera intrinsics and a corresponding rotation matrix can be estimated from three mutually orthogonal vanishing points. These approaches strongly rely on a process of edge detection and line fitting for accurately determining vanishing points. Unfortunately, methods that use line features share similar processes, and the accuracy and robustness are often susceptible to noisy and faulty low-level feature extraction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Camera Calibrator," as described herein, provides a simple, accurate, and flexible method to calibrate intrinsic parameters of a camera even with significant lens distortion, noise, errors, partial occlusions, illumination and viewpoint change, etc. Calibration is achieved under a wide range of practical scenarios, including using multiple images of a known pattern, multiple images of an unknown pattern, single or multiple images of multiple patterns, etc. Significantly, calibration is achieved without extracting or manually identifying low-level features such as corners or edges from the calibration images.

The Camera Calibrator provides various techniques for automatically and accurately recovering intrinsic and extrinsic camera parameters and lens distortion characteristics or parameters of the camera based on a set of one or more input images. Note that camera intrinsic parameters include focal length, skew and principal point of input images, and that extrinsic parameters include rotation, and translation of the input images relative to the camera. These techniques make use of a "Transform Invariant Low-Rank Texture" (TILT)

extraction process that extracts low-rank textures, and the geometry associated with those textures, from input images using high-dimensional convex optimization tools for matrix rank minimization and sparse signal recovery. The information retrieved from this rank-minimization process is then used for camera calibration and/or correction of other images captured by that same camera.

It should be noted that the TILT extraction process used by the Camera Calibrator is described in detail in co-pending U.S. patent application Ser. No. 12/955,734, filed on Nov. 29, 2010, by Yi Ma, et al., and entitled "ROBUST RECOVERY OF TRANSFORM INVARIANT LOW-RANK TEXTURES," the subject matter of which is incorporated herein by this reference. In general, the TILT process described in the co-pending U.S. Patent Application provides various techniques for efficiently and effectively extracting a rich class of low-rank textures representing regions of a 3D scene from 2D images of the scene despite significant and concurrent domain transforms. Examples of such domain transforms include, but are not limited to, translation, rotation, reflection, skew, scale, etc. The low-rank textures provided by the TILT process are useful for capturing geometrically meaningful structures in an image, which encompass conventional local features such as edges and corners as well as all kinds of approximately regular or approximately symmetric patterns, ubiquitous in urban environments and with other natural or man-made objects. The geometry of these captured structures is then used for calibration purposes and/or image correction, as described herein.

In the case of a single image containing some arbitrary regular structure (e.g., a regular geometric pattern such as a typical building facade) as input, the Camera Calibrator will return lens distortion parameters, focal length, and an undistorted version of the input image as an output. This information can be used for camera calibration and/or correction of other images captured by that same camera.

In the case of a single image that contains two orthogonal planes (e.g., an image of the corner of a building showing two orthogonal faces of that building to the left and right of the building corner), the Camera Calibrator will return lens distortion parameters, intrinsic parameters including principal point or origin of the image and the focal length, and an undistorted version of the input image as an output. This information can be used for camera calibration and/or correction of other images captured by that same camera.

Finally, in the case of multiple images of the same arbitrary regular structure that are captured from varying points of view, the Camera Calibrator will return lens distortion parameters, intrinsic parameters including focal length, skew, and principal point, extrinsic parameters including rotation, and translation, and an undistorted version of the input image as an output. Again, this information can be used for camera calibration and/or correction of other images captured by that same camera.

More specifically, the Camera Calibrator adopts the TILT process to create a simple yet robust camera calibration technique that provides accurate solutions for camera calibration or self-calibration without requiring the extraction, labeling, or matching of any low-level features such as points and edges. The techniques and algorithms provided by the Camera Calibrator work directly with raw image intensity values and can accurately estimate the camera intrinsic parameters and lens distortion characteristics under a broad range of practical input conditions including single or multiple images having known or unknown patterns, even when such images include noise, saturations, occlusions, varying illumination conditions, etc.

Given these capabilities, the Camera Calibrator can be used either for pre-calibrating a camera from a known pattern or for performing automatic self-calibration from arbitrary images of structured scenes (e.g., images of arbitrary buildings or objects having regular geometric structures). Further, the Camera Calibrator is capable of operating under inaccurate initialization parameters (i.e., rough or approximate selection of some structured region of an input image), and is therefore very user-friendly, even for users with little or no calibration or camera skills or knowledge. Advantageously, the Camera Calibrator uses scalable optimization techniques that can quickly achieve accurate calibration solutions under initialization conditions that are more flexible than conventional techniques while working with a broader range of input image types and conditions.

In view of the above summary, it is clear that the Camera Calibrator described herein provides various techniques for automatically and accurately recovering intrinsic and extrinsic camera parameters and lens distortion characteristics based on a process that extracts "Transform Invariant Low-Rank Textures" (TILT) from a set of one or more input images. In addition to the just described benefits, other advantages of the Camera Calibrator will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
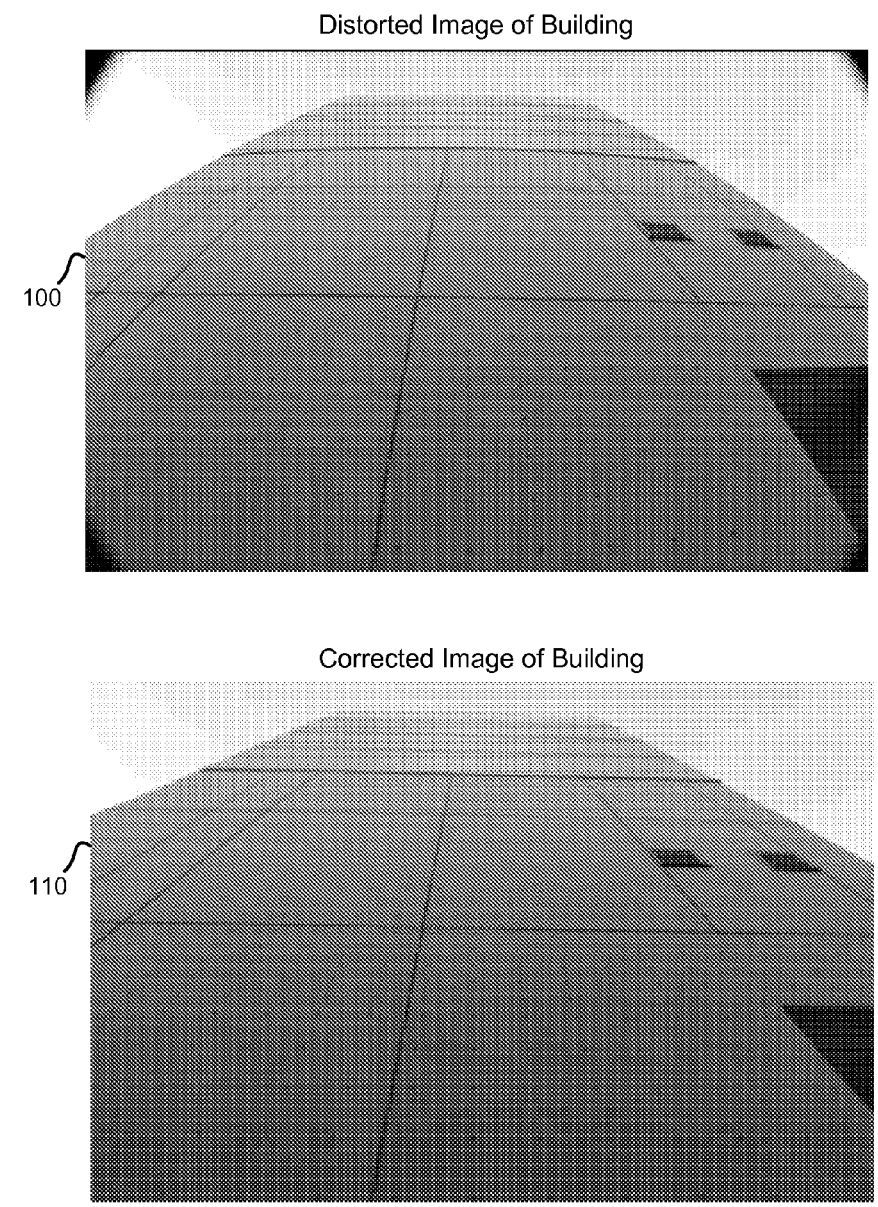
FIG. 1 provides an example of distortion in an image of a building captured using a fisheye lens, with distortions then being removed by a "Camera Calibrator," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, a "Camera Calibrator," as described herein, provides various techniques for recovering intrinsic and extrinsic camera parameters and lens distortion characteristics by processing a set of one or more input images. These techniques are based on extracting "Transform Invariant Low-Rank Textures" (TILT) (see Section 2.1) from input images using high-dimensional convex optimization tools for matrix rank minimization and sparse signal recovery. The geometry of the structures of these low-rank textures is then used for calibration purposes and/or image correction, as described herein. Note that camera intrinsic parameters include focal length, skew and principal point of input images, and that extrinsic parameters include rotation, and translation of the input images relative to the camera.

The Camera Calibrator provides a simple, accurate, and flexible method to calibrate intrinsic parameters of a camera even with significant lens distortion, noise, errors, partial occlusions, illumination and viewpoint change, etc. Further, given a sufficient number of images, the Camera Calibrator will also return extrinsic parameters of the input images. Note that the Camera Calibrator only recovers translations from the input images if both the pattern in the selected region and its metric are known. As with other calibration techniques, the Camera Calibrator is capable of operating with a typical calibration rig, such as a 2D object having a low-rank pattern such as a checkerboard image. However, in contrast to other calibration techniques, the Camera Calibrator is also capable of operating with arbitrary images of 2D or 3D objects or scenes having some region of regular geometric structure. More specifically, camera calibration is achieved under a wide range of practical scenarios, including using multiple images of a known pattern, multiple images of an unknown pattern, single or multiple images of multiple patterns, etc. Significantly, calibration is achieved without extracting or manually identifying low-level features such as corners or edges from the calibration images.

In the case of a single image containing some arbitrary regular structure (e.g., a regular geometric pattern such as a building facade or a checkerboard pattern) as input, the Camera Calibrator will return information including lens distortion parameters, focal length, skew, and an undistorted version of the input image as an output. In the case of a single image that contains two orthogonal planes (e.g., an image of the corner of a building showing two orthogonal faces of that building to the left and right of the building corner), the Camera Calibrator will return lens distortion parameters, principal point or origin of the image, focal length, skew, and an undistorted version of the input image as an output. Finally, in the case of multiple images of the same arbitrary regular structure that are captured from varying points of view, the Camera Calibrator will return lens distortion parameters, intrinsic parameters including focal length, skew, and principal point, extrinsic parameters including rotation, and translation, and an undistorted version of the input image as an output.

In general, any image captured by a camera may be distorted by both perspective projection (i.e., camera viewing direction relative to the scene) and the camera (radial) distortion (which is generally a relatively small distortion, depending upon the quality of the camera and lens). However, given one or more images of the scene, the Camera Calibrator concurrently recover distortions inherent to the camera and lens and the pose or orientation of the scene relative to the camera by undoing the distortion (i.e., recovering the transforms, τ, across the viewing plane) and recovering a low-rank pattern in the image region being processed.

This information can then be applied to other images captured by that camera to automatically remove such deformations or distortions from those additional images. For example, FIG. 1 provides an example of a distorted image 100 of a building captured using a fisheye lens, with distortions then being removed by the Camera Calibrator to produce a corrected image 110 of that building, as described herein.

Advantageously, the capabilities provided by the Camera Calibrator avoid many of the difficulties inherent in conventional camera calibration methods that generally require the user to manually select or identify feature points on the images or to carefully specify some number of corners and edges. Another advantage of the Camera Calibrator is that, in the case of multiple input images of a scene, the Camera Calibrator achieves per pixel alignment without any feature detection or extraction in contrast to conventional auto-calibration techniques.

Figure 2:
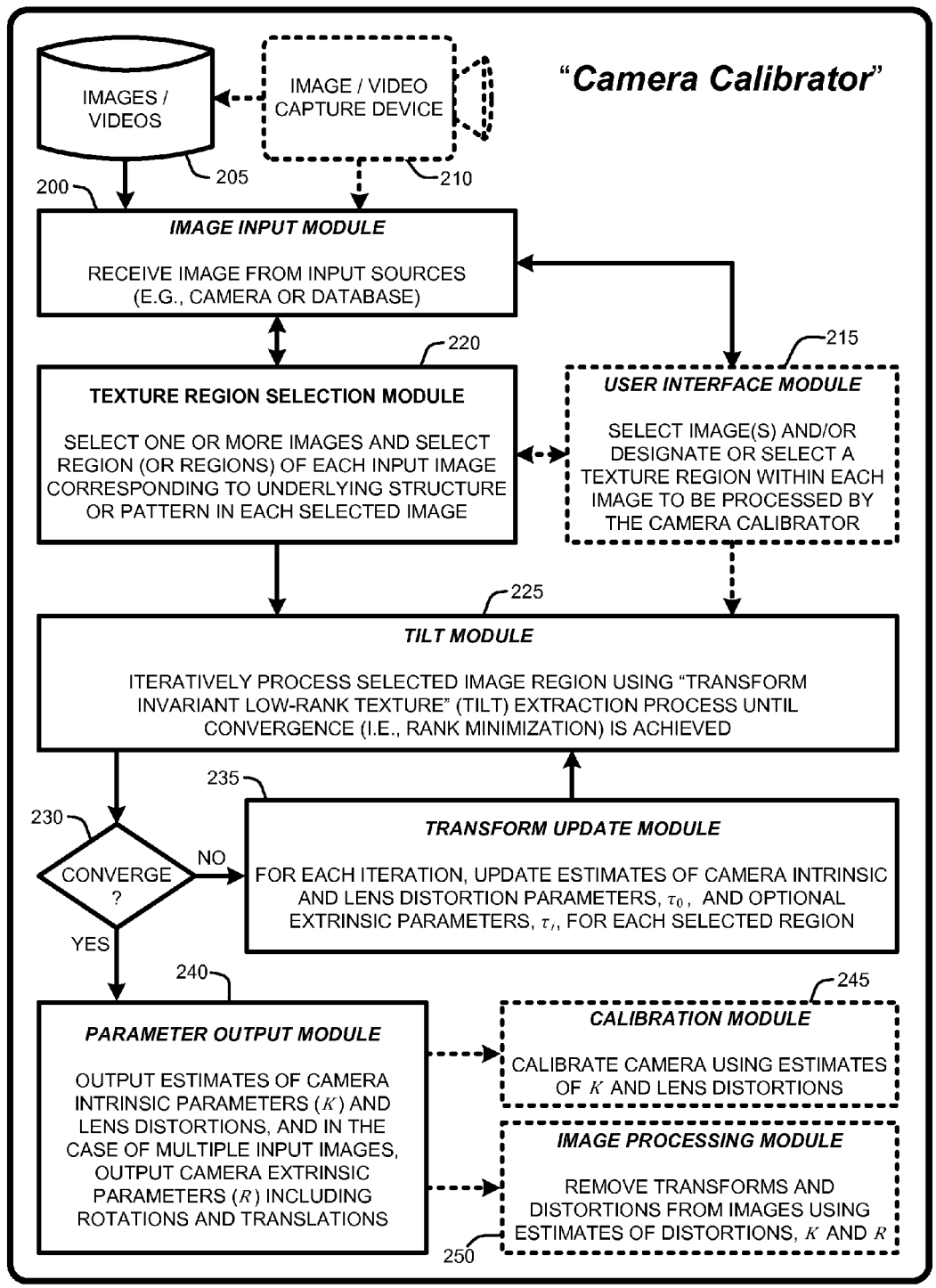
FIG. 2 provides an exemplary architectural flow diagram that illustrates program modules for automatically recovering intrinsic and extrinsic camera parameters and distortion characteristics based on a process that extracts "Transform Invariant Low-Rank Textures" (TILT) from a set of one or more input images using the "Camera Calibrator," as described herein.

1.1 System Overview:

As noted above, the "Camera Calibrator," provides various techniques for automatically and accurately recovering intrinsic and extrinsic camera parameters and distortion characteristics based on a process that extracts "Transform Invariant Low-Rank Textures" (TILT) from a set of one or more input images. The processes summarized above are illustrated by the general system diagram of FIG. 2. In particular, the system diagram of FIG. 2 illustrates the interrelationships between program modules for implementing various embodiments of the Camera Calibrator, as described herein. Furthermore, while the system diagram of FIG. 2 illustrates a high-level view of various embodiments of the Camera Calibrator, FIG. 2 is not intended to provide an exhaustive or complete illustration of every possible embodiment of the Camera Calibrator as described throughout this document.

In addition, it should be noted that any boxes and interconnections between boxes that may be represented by broken or dashed lines in FIG. 2 represent alternate embodiments of the Camera Calibrator described herein, and that any or all of these alternate embodiments, as described below, may be used in combination with other alternate embodiments that are described throughout this document.

Note also that for purposes of explanation, the following discussion of FIG. 2 will generally refer to the processing of a single image. However, it should be understood that as discussed in further detail herein, the use of multiple images of a single scene allows more information to be extracted from those images by the Camera Calibrator for use in calibrating associated cameras and/or correcting image transformations or distortions caused by the camera used to capture those images.

In general, as illustrated by FIG. 2, the processes enabled by the Text Rectifier begin operation by using an image input module 200 to receive one or more images extracted or selected from a database of images or videos 205. The database of images or videos 205 is either pre-recorded, or is recorded or captured using a conventional image or video capture device 210. A texture region selection module 220 is used to automatically select one or more images, and one or more regions (or "input windows") in each image for processing by the Camera Calibrator. In general, each input window or selected region approximately corresponds to an underlying geometric structure or pattern in each selected image.

Note that as discussed in further detail herein, the word "approximate" is used with respect to region selection since, in contrast to conventional techniques, the Camera Calibrator does not require an exact selection of particular image regions, structure corners or edges, principal points or points of origin, etc. With respect to automated region selection, any desired existing or conventional segmentation method that is capable of at least approximately detecting the region of the pattern or structure in the image can be used. Again, as discussed herein, there is no need for highly precise selection of input windows.

Note also that an optional user interface module 215 can be used to select from a library or list of the images or videos in the database of images or videos 205 or to select an image input from the image or video capture device 210. In addition, the user interface module 215 can also be used to designate or select the region or "input window" of each image that is to be processed by the Camera Calibrator.

In either case, once the image has been selected and the region of the image to be processed has been selected or otherwise specified, the image is provided to a TILT module 225. In general, the TILT module 225 iteratively processes the selected image region using the transform invariant low-rank texture (TILT) extraction process discussed in Section 2.1 to perform an iterative convex optimization process that loops until convergence (230) to a low-rank solution (i.e., rank minimization). The geometry and structure associated with these low-rank texture is then used for calibration purposes and/or image correction, as described herein.

As discussed in detail throughout Section 2 of this document, the low-rank solution includes texture regions ($I^0$) and associated transforms ($\tau$) that represent camera intrinsic parameters and lens distortions, and extrinsic parameters such as rotations and translations. More specifically, the intrinsic parameters include K, i.e., a focal length along x and y-axes $f_x$ and $f_y$, a skew parameter $\theta$, and coordinates of a principle point or origin ($o_x$, $o_y$). In other words, $$K = \begin{bmatrix} f_x & \theta & o_x \\ 0 & f_y & o_y \\ 0 & 0 & 1 \end{bmatrix}.$$

The intrinsic parameters also include distortions associated with the camera lens. Camera extrinsic parameters include rotation and translation information, i.e., R, extracted from the images for a Euclidean transformation from a world coordinate frame to a camera frame.

Following each processing iteration performed by the TILT module 225, the Camera Calibrator checks for convergence (230) of the low-rank solution. If convergence (230) has not been reached, a transform update module 235 updates or otherwise stores the transforms and corresponding low-rank solution information (i.e., the estimated lens distortions, camera intrinsic parameters, and optional camera extrinsic parameters) for use in the next processing iteration of the TILT module 225. Further, as discussed in Section 2.6, and with respect to "Algorithm 1", in the case of multiple input images of a particular structure or pattern, the Camera Calibrator extracts the homography $H_i$ for the ith image for the i= 1 . . . n images by the simultaneous alignment and rectification of the low-rank textures extracted from each image during the TILT process.

Once convergence (230) to the transforms is reached, a parameter output module 240 outputs the final estimates of camera intrinsic parameters (K) and lens distortions and, in the case of multiple input images, the camera extrinsic parameters (R). These solutions are then provided for use in a variety of applications, such as camera calibration or image processing to remove distortions and/or transforms from those images.

For example, in the case of camera self-calibration, a calibration module 245 provides the estimates of K and the lens distortions to the camera used to capture the input images. This information is then applied by the camera directly to other images captured by that camera so that any distortions or transforms inherent in the camera can be automatically removed or corrected when the images are captured.

Another example of the use of the solutions provided by the parameter output module 240 includes the use of an image processing module 250 that uses the estimates of lens distortions in combination with the camera instrinsic parameters (K) and optional extrinsic parameters (R) to remove distortions and transforms from other images captured by a camera whether or not that camera is available. In other words, whether or not a particular camera is available to a user, so long as one or more images having sufficient regular structures captured by the camera are available, those images can be processed by the Camera Calibrator to obtain estimates for lens distortions, K and R. These estimates can then be applied to any other images that have been captured by the same camera to eliminate transforms and distortions from those images regardless of whether those images have any regular structures that are sufficient for processing by Camera Calibrator.

2.0 Operational Details of the Camera Calibrator

The above-described program modules are employed for implementing various embodiments of the Camera Calibrator. As summarized above, the Camera Calibrator provides various techniques for automatically and accurately recovering intrinsic camera parameters and distortion characteristics based on a process that extracts "Transform Invariant Low-Rank Textures" (TILT) from a set of one or more input images. The following sections provide a detailed discussion of the operation of various embodiments of the Camera Calibrator, and of exemplary methods for implementing the program modules described in Section 1 with respect to FIG. 1 and FIG. 2.

In particular, the following sections provide examples and operational details of various embodiments of the Camera Calibrator, including: an overview of Transform Invariant Low-Rank Texture (TILT) extraction; camera model with lens distortion; camera intrinsic parameters; camera extrinsic parameters; camera calibration from low-rank textures; camera calibration from multiple images of the same low-rank pattern; self-calibration from a single image; and various exemplary implementation scenarios.

2.1 Transform Invariant Low-Rank Texture (TILT) Extraction:

As noted above, the Camera Calibrator adapts a "Transform Invariant Low-Rank Texture" (TILT) extraction process that, when applied to selected regions of an image, recovers and removes image deformations and distortions while providing the calibration information for automatically removing such deformations and distortions from any other images captured by the same camera. Note that the TILT process is described in detail in co-pending U.S. patent application Ser. No. 12/955,734, filed on Nov. 29, 2010, by Yi Ma, et al., and entitled "ROBUST RECOVERY OF TRANSFORM INVARIANT LOW-RANK TEXTURES," the subject matter of which is incorporated herein by this reference. As such, the following paragraphs will only generally summarize the TILT process, followed by a detailed description of how that process is further adapted to perform the camera calibration techniques described herein. Therefore, any references to "TILT", the "TILT process" or similar terms within this document should be understood and interpreted in view of the detailed description provided by co-pending U.S. patent application Ser. No. 12/955,734.

In general, the TILT process provides various techniques for efficiently and effectively extracting a rich class of low-rank textures representing regions of a 3D scene from 2D images of the scene despite significant and concurrent domain transforms (including both affine and projective transforms). Examples of such domain transforms include, but are not limited to, translation, rotation, reflection, skew, scale, etc. The low-rank textures provided by the TILT process are useful for capturing geometrically meaningful structures in an image, which encompass conventional local features such as edges and corners as well as all kinds of approximately regular or approximately symmetric patterns, ubiquitous in urban environments and with other natural or man-made objects. Note that, as is well understood by those skilled in the art of linear algebra and matrix math, the rank of a linear map (corresponding to the output texture in this case) is the dimension of the linear map corresponding to the number of nonzero singular values of the map.

In other words, the TILT process extracts both textural and geometric information defining regions of low-rank planar patterns from 2D images of a scene. In contrast to conventional feature extraction techniques that rely on point-based features, the TILT process extracts a plurality of regions from an image and derives global correlations or transformations of those regions in 3D (e.g., transformations including translation, rotation, reflection, skew, scale, etc.) relative to an arbitrary, but automatically determinable, camera viewpoint (or viewing direction). In general, these regions are identified by processing windows of the image to identify the extracted region. In various tested embodiments, it was observed that window sizes having a minimum size of about 20×20 pixels produced good results. However, it should be understood that window size may be dependent on a number of factors, including, for example, overall image size, and the size of texture regions within the image.

More specifically, the TILT process is capable of finding and extracting low-rank textures by adapting convex optimization techniques that enable robust recovery of a high-dimensional low-rank matrix despite gross sparse errors to the image processing techniques described herein. By adapting these matrix optimization techniques to the image processing operations described herein, even for image regions having significant projective deformation, the TILT process is capable of accurately recovering intrinsic low-rank textures and the precise domain transforms from a single image, or from selected regions of that image. The TILT process directly applies to image regions of arbitrary sizes where there are certain approximately regular structures, even in the case of significant transforms, image corruption, noise, and partial occlusions.

The TILT process finds the low-rank textures in an image, or selected image region, by conducting an effective window-based search for the actual deformation (i.e., domain transforms) of the image in order to decompose the image into a low-rank component and a sparse error component relating to image intensity (or other image color channel). The TILT process finds optimal domain transforms by minimizing the rank of an undeformed (i.e., untransformed) version of the original image subject to some sparse errors by using convex optimization techniques to recover the low-rank textures from a sparse representation of the image.

Note that large numbers of low rank textures can be extracted from a single image, such as, for example, multiple separate regions of text within an image (e.g., text on building signs and/or street signs on a street). Note also that that the rectification process inherent in the texture extraction techniques described with respect to the TILT process provide a measure of the specific domain transforms (translation, rotation, reflection, skew, scale, etc.) that would be used to construct the low-rank textures identified in a particular image of a 3D scene. Consequently, the regions extracted by using the TILT process have associated geometric information that can be used to rectify those regions, or to enable a wide variety of image processing applications (such as camera calibration) relative to those regions and to the input image as a whole.

2.2 Camera Model with Lens Distortion:

The following paragraphs first briefly describes the common mathematical model used for camera calibration and introduces notation used throughout this document. In particular, a vector $M=(X_0, Y_0, Z_0)^T \in \mathbb{R}^3$ is used to denote the 3D coordinates of a point in the world coordinate frame, while the term $m_n = (x_n, y_n)^T \in \mathbb{R}^2$ is used to denote its projection on the canonical image plane in the camera coordinate frame. For convenience, the homogeneous coordinate of a point m is denoted as $$\tilde{m} = \begin{bmatrix} m \\ 1 \end{bmatrix}.$$

2.2.1 Lens Distortion Model:

If the lens of the camera is distorted, on the image plane, the coordinates of a point $m_n$ may be transformed to a different one, denoted as $m_d = (x_d, y_d)^T \in \mathbb{R}^2$. A commonly used general mathematical model for this distortion $D: m_n \mapsto m_d$ is given by a polynomial distortion model by neglecting any higher-order terms as illustrated below:

$$r \approx \sqrt{x_n^2 + y_n^2} \qquad \text{Equation (1)}$$

$$f(r) \approx 1 + k_c(1)r^2 + k_c(2)r^4 + k_c(5)r^6$$

$$m_d = \begin{bmatrix} f(r)x_n + 2k_c(3)x_n y_n + k_c(4)(r^2 + 2x_n^2) \\ f(r)x_n + 2k_c(4)x_n y_n + k_c(3)(r^2 + 2y_n^2) \end{bmatrix}$$

Notice that this model has a total of five unknowns $k_c(1), \ldots, k_c(5) \in \mathbb{R}$. If there is no distortion, then all $k_c(i)$ can be set to zero, with the result that $m_d = m_n$.

2.3 Intrinsic Parameters:

To transform a point into the pixel coordinates, the Camera Calibrator uses a pin-hole model parametrized by an intrinsic matrix $K \in \mathbb{R}^{3 \times 3}$, which also has five unknowns: the focal length along x and y-axes $f_x$ and $f_y$, skew parameter $\theta$, and coordinates of a principle point or origin $(o_x, o_y)$. In a matrix form, this can be described as follows:

$$K \approx \begin{bmatrix} f_x & \theta & o_x \\ 0 & f_y & o_y \\ 0 & 0 & 1 \end{bmatrix} \in \mathbb{R}^{3 \times 3} \qquad \text{Equation (2)}$$

2.4 Extrinsic Parameters:

The Camera Calibrator uses $R = [r_1, r_2, r_3] \in SO(3)$ and $T \in \mathbb{R}^3$ to denote the Euclidean transformation from the world coordinate frame to the camera frame, i.e., the so-called "extrinsic parameters." The rotation R can be parameterized by a vector $\omega=(\omega_1, \omega_2, \omega_3)^T \in \mathbb{R}^3$ using the well-known "Rodrigues' formula", $$R(\omega) = I + \sin\|\omega\|\frac{\hat{\omega}}{\|\omega\|} + (1-\cos\|\omega\|)\frac{\hat{\omega}^2}{\|\omega\|^2},$$

where $\hat{\omega}$ denotes the 3×3 matrix form of the rotation vector $\omega$, defined as $\hat{\omega}=[0, -\omega_3, \omega_2; \omega_3, 0, -\omega_1; -\omega_2, \omega_1, 0]\in\mathbb{R}^{3\times3}$.

Using the above-described notation, the overall imaging process of a point M in the world to the camera pixel coordinates m by a pinhole camera can be described as:

$$\tilde{m} = K\tilde{m}_d = KD(\tilde{m}_n); \lambda\tilde{m}_n = [RT]\tilde{M} \quad \text{Equation (3)}$$

where λ is the depth of the point. If there is no lens distortion (i.e., assuming that $m_d = m_n$), the above model reduces to a typical pin-hole projection with an uncalibrated camera, where $\lambda\tilde{m} = K[RT]\tilde{M}$.

For purposes of explanation, the term $\tau_o$ is used herein to denote the intrinsic parameters and lens distortion parameters all together. Further, it should also be understood that the term $\tau_i$ (i=1, 2, ...) is used to denote the extrinsic parameters $R_i$ and $T_i$ for the i-th image. However, in order to simplify the discussion of the Camera Calibrator for purposes of explanation, the term $\tau_0$ is occasionally also used herein to represent the combined transformation of K and D acting on the image domain, i.e., $\tau_0(\bullet)=KD(\bullet)$, and use $\tau_i$ (i=1, 2, ...) to represent the transforms from the world to individual image planes.

2.5 Calibration from Low-Rank Textures:

In general, the Camera Calibrator estimates camera parameters from low-rank textures extracted from one or more input images. Advantageously, the pattern in the input image or images can be unknown so long as there is sufficient geometric structure in the image, i.e., as a matrix it is sufficiently low-rank (e.g., the normally used checkerboard is one such pattern).

The following paragraphs describe operation of the Camera Calibrator our method in two cases, including a case where multiple images are provided as input, and a case where only a single image is provided as input to the Camera Calibrator cases. In the case of multiple observations of low-rank textures extracted from multiple input images (see Section 2.6), the Camera Calibrator fully recover lens distortion, as well as camera intrinsic parameters and extrinsic parameters. In the case of a single image as input (see Section 2.7), the Camera Calibrator accurately estimates lens distortion as well as camera intrinsic parameters with additional yet reasonable assumptions that are discussed below.

By default, the Camera Calibrator chooses the origin of the world coordinate to be the top-left corner of the image and assumes that the image lies in the plane Z=0, and that X and Y are the horizontal and vertical directions, respectively. However, it should be understood that other origin selections and the use of other coordinate systems can be used to implement various embodiments of the Camera Calibrator by making the appropriate changes to the techniques described herein.

2.6 Calibration from Multiple Images of the Same Low-Rank Pattern:

Suppose that there are multiple images of a certain pattern $I_0 \in \mathbb{R}^{m_0 \times n_0}$ taken from N different viewpoints $R(\omega_i)$ and $T_i$ (in brief, $\tau_i$), with the same intrinsic matrix K and lens distortion $k_c$ (in brief, $\tau_0$). In practice, the observed images are not direct transformed versions of $I_0$ because each image may contain some background or partially occluded regions (e.g., due to a limited field of view of the camera) that differs from one or more of the other images. The term $E_i$ is used to model such error between the original pattern $I_0$ and the ith observed image $I_i$ with the transformations undone. Mathematically this is given by:

$$I_i \circ (\tau_0, \tau_i)^{-1} = I_0 + E_i \quad \text{Equation (4)}$$

where the operator "$\circ$" denotes the geometric transformations between the images. The task of camera calibration is then to recover $\tau_0$ and, generally, $\tau_i$ (1≤i≤N), from these images.

In general, it is assumed that $I_0$ is not known in advance (i.e., it is assumed that $I_0$ is some arbitrary structure). However, it should be understood that the Camera Calibrator is also fully capable of operating with known structures, as discussed herein. Thus, assuming that $I_0$ is unknown, the Camera Calibrator does not have any ground-truth pattern to compare or correspond with for the input images. Consequently, the Camera Calibrator fully recovers the distortion and calibration by utilizing only the low-rankness of the texture $I_0$ and by establishing precise correspondence among the N images $I_i$ themselves based on the corresponding low-rank textures extracted from each of those images.

2.6.1 Rectifying Deformation via Rank Minimization:

Since any texture extracted by the TILT process represents a low-rank pattern, then by using the TILT process described in the aforementioned co-pending patent application, the Camera Calibrator can estimate the deformation of each image $I_i$ from $I_0$ by solving the following robust rank-minimization problem:

$$\min\|A_i\|_* + \lambda\|E_i\|_1, \; s \cdot t \cdot I_i \circ (\tau_0, \tau_i)^{-1} = A_i + E_i \quad \text{Equation (5)}$$

with $A_i$, $E_i$, $\tau_i$ and $\tau_0$ as unknowns. As discussed with respect to the TILT process, if there is no radial distortion in $\tau_0$, the above optimization recovers the low-rank pattern $I_0$ up to a translation and scaling in each axis:

$$A_i = I_0 \circ \tau, \text{ where } \tau = \begin{bmatrix} s_x & 0 & m_x \\ 0 & s_y & m_y \\ 0 & 0 & 1 \end{bmatrix} \quad \text{Equation (6)}$$

However, in the case of camera calibration, both intrinsic parameters and distortion are present in the deformation. Therefore, a single image can no longer recover all the unknowns, though, as discussed below in the case of a single input image, sufficient information can still be recovered, given certain reasonable assumptions, to allow camera calibration from that single image.

In the case of multiple images, the Camera Calibrator is generally capable of extracting the information for all of the unknown parameters. In order to accomplish this, the Camera Calibrator uses the extracted low-rank textures to establish precise point-to-point correspondence among all the N images.

2.6.2 Simultaneous Alignment and Rectification:

In general, for calibration, the Camera Calibrator aligns all of the N images point-wise, and at the same time each resulting image is rectified as a low-rank texture. In other words, the Camera Calibrator performs an iterative process that extracts the homography $H_i$ for the ith image based on the transforms used to align and rectify those images. More specifically, the Camera Calibrator finds the transformation $\tau'_0, \tau'_i$ such that $I_i$, 1≤i≤N can be expressed as $$I_i \circ (\tau'_0 \circ \tau'_i)^{-1} = A_i + E_i \quad \text{Equation (7)}$$

where all $A_i$ are low-rank and equal to each other $A_i=A_j$. Therefore, the natural optimization problem associated with this problem becomes $$\min \sum_{i=1}^{N} \|A_i\|_* + \|E_i\|_1 \qquad \text{Equation (8)}$$

$$\text{s.t. } I_i \circ (\tau'_0 \circ \tau'_i)^{-1} = A_i + E_i, A_i = A_j.$$

Optimization techniques similar to that of TILT process can be used to solve the above optimization problem, such as the Alternating Direction Method (ADM) used by the TILT process. However, having too many constraining terms affects the convergence of such algorithms. In addition, in practice, due to different illumination and exposure times, the N images could differ from each other in intensity and contrast. Therefore, while optimization processes similar to those described with respect to the TILT process can be used, in various embodiments, the Camera Calibrator uses an alternative, and more effective and efficient process to align the images in the desired way.

More specifically, this alternative optimization process concatenates all the images as submatrices of a joint low-rank matrix:

$$D_1 \doteq [A_1, A_2, \ldots, A_N],$$

$$D_2 \doteq [A_1^T, A_2^T, \ldots, A_N^T]$$

$$E \doteq [E_1, E_2, \ldots, E_N]. \qquad \text{Equation (9)}$$

The Camera Calibrator then iteratively simultaneously aligns the columns and rows of $A_i$ and minimizes its rank by solving the following problem:

$$\min \|D_1\|_* + \|D_2\|_* + \lambda \|E\|_1,$$

$$s \cdot t \cdot I_i \circ (\tau_0 \circ \tau_i)^{-1} = A_i + E_i \qquad \text{Equation (10)}$$

with $A_i$, $E_i$, $\tau_0$, $\tau_i$ as unknowns. Notice that by comparing to Equation (8), which introduces in $$N + \frac{N(N-1)}{2}$$

constraints, the alternative optimization process used by the Camera Calibrator has just N constraints and hence is easier to solve. In addition, it this alternative optimization process is insensitive to illumination and contrast changes across different images. This alternative optimization process can be considered as a generalization of the TILT process since when N=1, this alternative optimization process reduces to original TILT process.

To deal with the nonlinear constraints in Equation (10), the constraints $I_i \circ (\tau_0, \tau_i)^{-1} = A_i + E_i$ are linearized with respect to all of the unknown parameters $\tau_0$, $\tau_i$. To reduce the effect of change in illumination and contrast, $I_i \circ (\tau_0, \tau_i)^{-1}$ is then normalized by its "Frobenius norm" to $$\frac{I_i \circ (\tau_0 \circ \tau_i)^{-1}}{\|I_i \circ (\tau_0 \circ \tau_i)^{-1}\|_F}.$$

Then, let the Jacobian $$J_i^0 = \frac{\partial}{\partial \tau_0} \left( \frac{I_i \circ (\tau_0 \circ \tau_i)^{-1}}{\|I_i \circ (\tau_0 \circ \tau_i)^{-1}\|_F} \right)$$

be the Jacobian of the normalized image with respect to the shared intrinsic and distortion parameters $\tau_0$ and let $$J_i^1 = \frac{\partial}{\partial \tau_i} \left( \frac{I_i \circ (\tau_0 \circ \tau_i)^{-1}}{\|I_i \circ (\tau_0 \circ \tau_i)^{-1}\|_F} \right)$$

be the Jacobian with respect to extrinsic parameters $\tau_i$ for each image. The local linearized version of Equation (10) then becomes:

$$\min \|D_1\|_* + \|D_2\|_* + \lambda \|E\|_1,$$

$$s \cdot t \cdot I_i \circ (\tau_0, \tau_i)^{-1} + J_i^0 \Delta \tau_0 + J_i^1 \Delta \tau_i = A_i + E_i \qquad \text{Equation (11)}$$

with $\Delta \tau_0$, $\Delta \tau_i$, $A_i$, $E_i$ as unknowns. Notice that this linearized problem is a convex optimization problem that can be efficiently solved by various high-dimensional optimization methods such as the ADM method discussed above. To find the global solution to the original nonlinear problem of Equation (10), $\tau_0$ and $\tau_i$ are incrementally updated by $\Delta \tau_0$, $\Delta \tau_i$ while iteratively rerunning steps 1 through 3 of Algorithm 1 (see below) until convergence.

---

Algorithm 1: Align Low-rank Textures for Calibration

Input: Selection of an approximately rectangular window $I_i \in \mathbb{R}^{m_i \times n_i}$ in each
image, initial extrinsic parameters $\tau_i$, common intrinsic and lens
distortion parameters $\tau_0$, and weight $\lambda > 0$
While not converged Do
    Step 1: For each image, normalize it and compute the Jacobian
        with respect to the following unknown parameters:

$$I_i \circ (\tau_0, \tau_i)^{-1} \leftarrow \frac{I_i \circ (\tau_0, \tau_i)^{-1}}{\|I_i \circ (\tau_0, \tau_i)^{-1}\|_F};$$

$$J_i^0 \leftarrow \frac{\partial}{\partial \zeta_0} \left( \frac{I_i \circ (\zeta_0, \zeta_i)^{-1}}{\|I_i \circ (\zeta_0, \zeta_i)^{-1}\|_F} \right) \bigg| \zeta_0 = \tau_0, \zeta_i = \tau_i;$$

$$J_i^0 \leftarrow \frac{\partial}{\partial \zeta_0} \left( \frac{I_i \circ (\zeta_0, \zeta_i)^{-1}}{\|I_i \circ (\zeta_0, \zeta_i)^{-1}\|_F} \right) \bigg| \zeta_i = \tau_i, \zeta_0 = \tau_0;$$

Step 2: Solve the linearized convex optimization problem:
        $\min \|D_1\|_* + \|D_2\|_* + \lambda \|E\|_1,$
        s.t. $I_i \circ (\tau_0, \tau_i)^{-1} + J_i^0 \Delta \tau_0 + J_i^1 \Delta \tau_i = A_i + E_i;$
    Step 3: Update: $\tau_0 \leftarrow \tau_0 + \Delta \tau_0$ and $\tau_i \leftarrow \tau_i + \Delta \tau_i;$
End While
Output: Converged solution $\tau_i$, $\tau_0$.

---

In general, as long as there is sufficient textural variation in the pattern extracted from the input images, the lens distortion parameters $k_c$ can always be accurately estimated by the Camera Calibrator once the low-rank texture of the pattern is fully rectified. This is the case even from a single image.

Now the remaining question is, under what conditions the correct intrinsic parameters K and the extrinsic parameters ($R_i$, $T_i$) are the global minimum to the problem of Equation (10), and whether there is still some ambiguity. This question is answered below in view of Proposition 1 and the corresponding proof.

Proposition 1—Ambiguities in Calibration with an Unknown Pattern:

Given $N \geq 5$ images of the low-rank pattern $I_0$ taken by a camera with the same intrinsic parameters K under generic viewpoints represented by the expression $\tau_i = (R_i, T_i)$: $I_i = I_0 \circ (\tau_0 \circ \tau_i)$, i=1, ..., N. Then the optimal solution (K', $\tau'_i$) to the problem of Equation (10) satisfies K'=K and R'$_i$=R$_i$.

In other words, in accordance with proposition 1, all of the distortion and intrinsic parameters $\tau_0$ can be recovered along with the rotation $R_i$ of each image. Thus, there is only ambiguity left in the recovered translation $T_i$ of each image.

Proof of Proposition 1:

Suppose that by solving Equation (10), all the images are aligned up to translation and scaling of $I_0$. In other words, suppose that the solution to Equation (10) has found $\tau'_i = (R'_i, T'_i)$ and $\tau'_0 = (K', k'_c)$ such that:

$$I_i \circ (\tau'_0 \circ \tau'_i)^{-1} = I_0 \circ \tau, \text{ with } \tau = \begin{bmatrix} s_x & 0 & m_x \\ 0 & s_y & m_y \\ 0 & 0 & 1 \end{bmatrix} \quad \text{Equation (12)}$$

Therefore, as all the lines have become straight in the recovered images $A_i$, the radial distortion parameters $k'_c$ is exactly $k'_c = k_c$.

Here $s_x, s_y$ are scaling in the x and y directions of the aligned images $A_i$ with respect to the original low-rank pattern $I_0$. Further, $m_x$ and $m_y$ are the translations between $A_i$ and $I_0$. Now, consider the mapping between a point $M_0$ on $I_0$ (notice that the Z-coordinate is zero by default) and its image $\tilde{m} \in \mathbb{R}^3$ (in homogeneous coordinates): $\lambda \tilde{m} = K[r_1, r_2, T] M_0$. As the recovered parameters are consistent with all constraints, this means that the same point and its image satisfy the following expression:

$$\lambda' \tilde{m} = K'[r'_2, r'_2, T'] \begin{bmatrix} s_x & 0 & m_x \\ 0 & s_y & m_y \\ 0 & 0 & 1 \end{bmatrix} M_0 \quad \text{Equation (13)}$$

Therefore, the matrix $K[r_1, r_2, T]$ is equivalent to $K'[s_x r'_1, s_y r'_2, m_x r'_1 + m_y r'_2 + T']$ (i.e., up to a scale factor), thus resulting in the following:

$$\begin{cases} Kr_1 = \xi s_x K' r'_1 \\ Kr_2 = \xi s_y K' r'_2 \end{cases} \Rightarrow \begin{cases} K'^{-1} Kr_1 = \xi s_x r'_1 \\ K'^{-1} Kr_2 = \xi s_y r'_2 \end{cases} \quad \text{Equation (14)}$$

Then, since $r'_1{}^T r_2 = 0$, this means that:

$$(Kr_1)^T K'^{-T} K'^{-1} (Kr_2) = 0 \quad \text{Equation (15)}$$

This gives one linear constraint for $B = K'^{-T} K'^{-1}$. Such a symmetric B has six degrees of freedom. Since each image gives one constraint on B, a minimum of five general images (not in degenerate configurations) are sufficient to recover B up to a scale factor, s. Since $K^{-T} K^{-1}$ is also a solution, then this means that K'=K as the unique solution of the form of Equation (2). Further from Equation (14), $r'_1 = r_1$, $r'_2 = r_2$, and $s_x = s_y$. In other words, once all of the images are aligned and rectified, they only differ from the original pattern $I_0$ by a global scale factor $s = s_x = s_y$ and a translation $(m_x, m_y)$. In addition, the recovered rotation $R'_i$ is the correct $R'_i = R_i$. However, since the exact values of $s_x$, $m_x$, and $m_y$, are not yet known, the recovered $T'_i$ is not necessarily the correct $T_i$.

With a similar analysis, it can be seen that in fact if the images are individually rectified, the correct K and $R_i$ can still be obtained. The only difference in this case is that $s_x$, $s_y$, $m_x$ and $m_y$ are all different for different images, thus the translations $T_i$ are even less constrained.

2.6.3 Use of a Known Pattern:

If the ground-truth $I_0$ is given and its metric is known (e.g., using a known pattern such as a checkerboard pattern), then it may be advantageous (though not required) to align $I_i$ to $I_0$ directly or indirectly. One solution to this case is to slightly modify Algorithm 1 by appending $D_1, D_2, E$ with $A_0, A_0^T, E_0$, respectively, and adding the constraint that $I_0 = A_0 + E_0$. A second solution to this case is to align the already rectified textures $A_i$ to $I_0$ by maximizing the correlation.

With either of these two solutions, given knowledge about the metric of $I_0$, then $T_i$ can be specifically determined along with the full set of intrinsic and extrinsic parameters for the camera.

In particular, if the low-rank pattern $I_0$ is given, then $I_i$ can be directly or indirectly aligned to $I_0$. Then, similar to the proof of Proposition 1, shown above, it can be seen that $s_x$, $m_x$ and $m_y$ can be directly recovered with respect to the ground truth metric of $I_0$. Then for each image the ground-truth translation, T, can be recovered by:

$$T = \frac{m_x r_1 + m_y r_2 + T'}{s_x} \quad \text{Equation (16)}$$

2.7 Self-Calibration from a Single Image:

As noted above, camera self-calibration can be performed with only a single image, rather than using a set of input images, as described above in Section 2.6. In this case, some reasonable assumptions are made regarding the input image.

2.7.1 Assumption that the Image Represents a Single Plane:

For most everyday usage of a camera, people normally do not need to know the full intrinsic parameters of the camera. For instance, for webcam users, it normally suffices if the user (or the user's computer system) can simply remove any annoying lens distortion (often fisheye or radial type distortions). For such users, asking them to take multiple images and conduct a full calibration might be too much trouble.

Further, it can sometimes be useful to remove the radial distortion of an image where there is no access to the camera itself. In other words, single distorted images having sufficient geometric structure can be undistorted or "corrected" by processing that image using the Camera Calibrator, then removing the recovered distortions and any intrinsic and extrinsic parameters from that image. Further, as noted above, other images captured by that same camera can then also be corrected (whether or not those images have sufficient structure for processing) by simply applying the same parameters recovered from any images from the same camera that do have sufficient structure for processing.

Therefore, it is clearly a useful capability for the Camera Calibrator to calibrate the lens distortion of a camera from a single arbitrary image. Normally this would be impossible for a generic image (using conventional calibration techniques). Nevertheless, if the image contains a plane with low-rank pattern rich with horizontal and vertical lines (i.e., assuming that the image has sufficient structure for processing by the Camera Calibrator), then the lens distortion k, can be correctly recovered by the Camera Calibrator. The recovered distortions can then be used to correct any other images captured by that same camera.

In particular, given a single image with a single low-rank pattern, since every single intrinsic parameter can not be expected to be correctly recovered, the following simplifying assumptions are made regarding K:

1. The image region being processed by the Camera Calibrator has no skew, i.e., $\theta = 0$;
2. The principal point (i.e., the origin) of the selected image region is known (say set at the center of the image); and 3. Each image pixel is square to the camera relative to the focal length f, i.e., $f_x=f_y=f$.

Although the above described assumptions may appear to be somewhat restrictive, they approximately hold for many cameras made today. In this circumstance, if the viewpoint is not degenerate, applying the algorithm to the image of this single pattern correctly recovers the lens distortion parameters $k_c$ and the focal length f, thereby allowing both calibration of the camera, and correction of other images captured by that camera.

2.7.2 Assumption that Image Includes Two Orthogonal Planes:

Very often, an image contains more than one planar low-rank textures, and they satisfy additional geometric constraints. For instance, in a typical urban scene, an image often contains two orthogonal facades of a building (e.g., an image of the corner of a building showing two orthogonal faces of that building to the left and right of the building corner). Each facade is typically full of horizontal and vertical lines (e.g., windows) and can each be considered as a low-rank texture.

Figure 4:
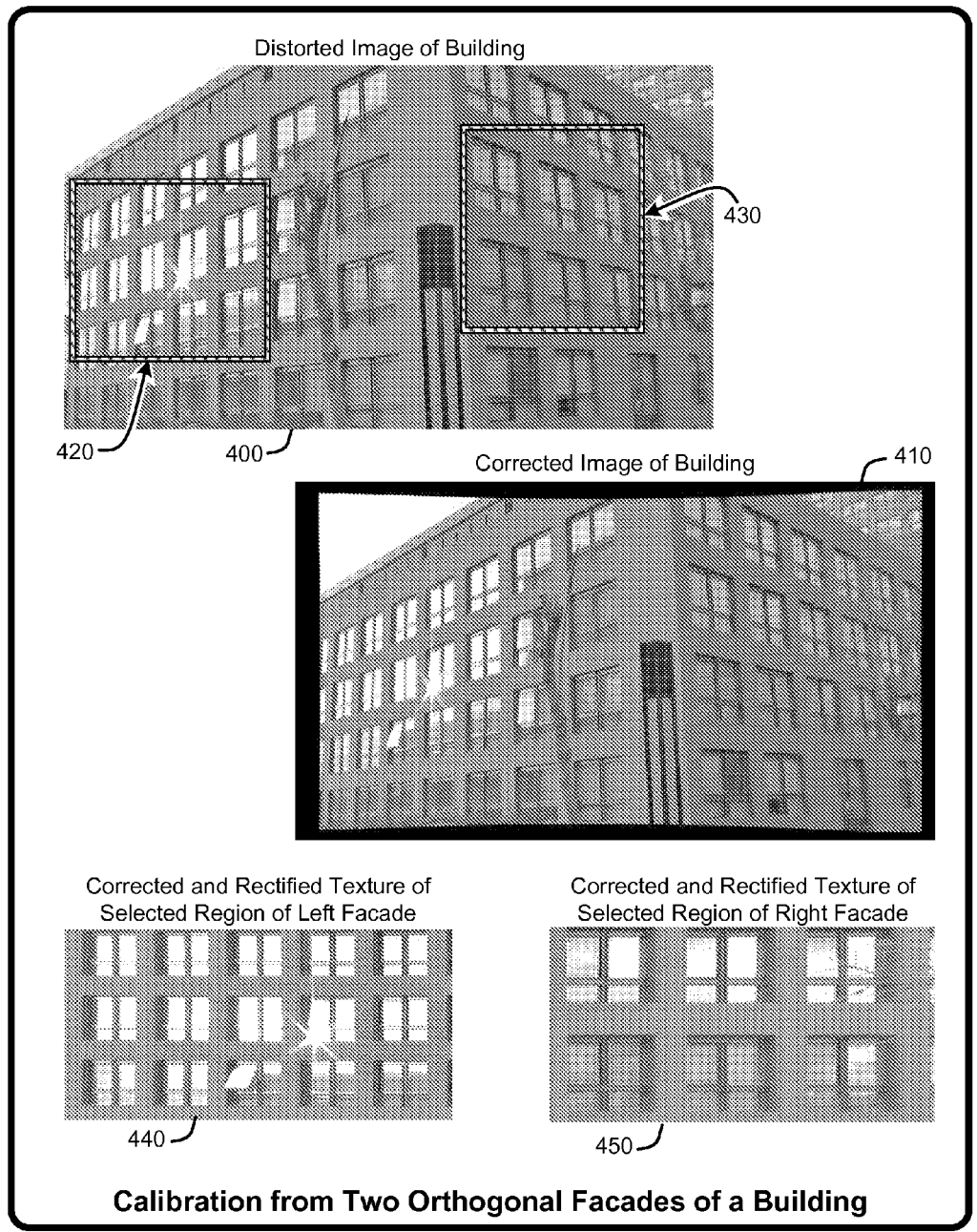
FIG. 4 provides an example of calibration from two orthogonal facades of a building, as described herein.

FIG. 4 provides a simple example of this exact scenario. In particular, FIG. 4 provides a distorted image 400 of a building captured by some unknown camera. Regions or input windows are selected on each of the left facade 420 and the right facade 430 of the building for input to the Camera Calibrator. Image 410 illustrates a corrected image of the building following removal of distortions and transforms identified in the original distorted image 400. Further, low-rank texture 440 provides a corrected and rectified version of input window on the left facade 420, while low-rank texture 450 provides a corrected and rectified version of the input window on the right facade 430 following processing by the Camera Calibrator.

In this case, the image encodes much richer information about the camera calibration that allows both the focal length and the principal point to be recovered from such an image, given the following simplifying assumptions:

1. The image region being processed by the Camera Calibrator has no skew, i.e., $\theta=0$; and
2. Each image pixel is square to the camera relative to the focal length f, i.e., $f_x=f_y=f$.

For simplicity, assume that the intersection of the two orthogonal planes in the image region being processed by the Camera Calibrator is the z-axis of the world frame, and that the two planes are $x=0$ and $y=0$, each with a low-rank texture $I_0^{(i)}$, $i=1,2$. Then, assume that the image of the two orthogonal planes is captured by a camera with intrinsic parameters K and lens distortion $k_c$, from the viewpoint (R,T). This image, which contains two mutually orthogonal low-rank patterns, is then denoted as I.

Then, let $M_L=[0\ Y_1\ Z_1]^T \in \mathbb{R}^3$ be a point on the left facade of the building, let $M_R=[X_2\ 0\ Z_2]^T \in \mathbb{R}^3$ be a point on the right facade, and let $m_L, m_R \in \mathbb{R}^2$ be the corresponding image regions on I. This then results in the following expressions for the left and right facades of the building:

$$\lambda_1 \tilde{m}_L = \begin{bmatrix} f & 0 & o_x \\ 0 & f & o_y \\ 0 & 0 & 1 \end{bmatrix} [r_2\ r_3\ T_1] \begin{bmatrix} Y_1 \\ Z_1 \\ 1 \end{bmatrix} \quad \text{Equation (17)}$$

$$\lambda_2 \tilde{m}_R = \begin{bmatrix} f & 0 & o_x \\ 0 & f & o_y \\ 0 & 0 & 1 \end{bmatrix} [r_1\ r_3\ T_2] \begin{bmatrix} X_2 \\ Z_2 \\ 1 \end{bmatrix} \quad \text{Equation (18)}$$

Note that in order to simplify the process, these two expressions use a different translation $T_1$ or $T_2$ for each plane. However, it should be understood that a single translation T can be used here, but that this requires an additional step for finding the exact position of the intersection of the two planes (i.e., the exact position of the corner between the planes). Therefore, assuming the use of a different translation $T_1$ and $T_2$ for each plane, let $\tau_0 = [f, o_x, o_y, k_c(1:5), \omega]$ and $\tau_i = [T_i]$. Thus, the optimization problem for recovering these parameters is:

$$\min_{A_i, E_i, \tau_0, \tau_i} \|A_i\|_* + \|A_2\|_* + \lambda(\|E_1\|_1 + \|E_2\|_1), \quad \text{Equation (19)}$$

subject to $I \circ (\tau_0, \tau_i)^{-1} = A_i + E_i$.

In view of Proposition 2 and the corresponding proof, it can be seen that by using similar normalization and linearization techniques to those discussed above, this problem can be solved with slight modification to Algorithm 1.

Proposition 2—Ambiguities in Calibration with Two Orthogonal Planes:

Given one image of two orthogonal planes with low-rank textures, taken by a camera from a generic viewpoint (R, T) with intrinsic parameters K with zero skew, $\theta=0$, and square pixels ($f_x=f_y$), then if K', R', T'$_1$, T'$_2$ are solutions to the optimization problem of Equation (19), then K'=K, R'=R.

Proof of Proposition 2:

Similar to the multiple-image case discussed in Section 2.6, $\tau_0$ can be recovered by rectifying the left and right textures with a joint parameterization of the rotation for the two planes. In particular, suppose a low-rank texture lies on the left plane $X=0$ and another low-rank texture lies on the right plane $Y=0$. Then, $M_L=(0, Y_1, Z_1)$ is a point on the left plane, and $M_R=(X_2, 0, Z_2)$ is a point on the right plane. Similarly, there is an image point $m_L=(x_L, y_L)$ of the left point and $m_R=(x_R, y_R)$ of the right point. Then, in accordance with Equations (17) and (18), this results in the following expressions:

$$\lambda_1 m_L = \begin{bmatrix} f & 0 & o_x \\ 0 & f & o_y \\ 0 & 0 & 1 \end{bmatrix} [r_2\ r_3\ T] \begin{bmatrix} Y_1 \\ Z_1 \\ 1 \end{bmatrix} \quad \text{Equation (20)}$$

$$\lambda_2 m_R = \begin{bmatrix} f & 0 & o_x \\ 0 & f & o_y \\ 0 & 0 & 1 \end{bmatrix} [r_1\ r_3\ T] \begin{bmatrix} X_2 \\ Z_2 \\ 1 \end{bmatrix} \quad \text{Equation (21)}$$

Note that for purposes of explanation, the term (x, y) is used to represent points both on $Y=0$ and on $X=0$, however, it should be clear that these points are not the same. Suppose the rectified image $A_i$ differs from the ground truth $I_0^{(i)}$ by scaling and translation: $s_x^{(i)}, s_y^{(i)}, m_x^{(i)}, m_y^{(i)}$. Then, this means that the ground truth K, R=[$r_1\ r_2\ r_3$] and T, and the recovered parameters K', R'=[$r'_1\ r'_2\ r'_3$] and T'$_1$, T'$_2$ are related through the following expressions:

$$[s_x^{(1)} Kr_2 \ \ s_y^{(1)} Kr_3 \ \ (m_x^{(1)} r_2 + m_y^{(1)} r_3 + T)] = \quad \text{Equation (22)}$$
$$\xi_1 [K'r'_2 \ \ K'r'_3 \ \ K'T'_1],$$

$$[s_x^{(2)} Kr_1 \ \ s_y^{(2)} Kr_3 \ \ (m_x^{(2)} r_1 + m_y^{(2)} r_3 + T)] =$$
$$\xi_2 [K'r'_1 \ \ K'r'_3 \ \ K'T'_2]$$

This then results in the following expression:

$$K'^{-1} K \left[ \frac{s_x^{(2)}}{\xi_2} r_1, \frac{s_x^{(1)}}{\xi_1} r_2, \frac{s_y^{(1)}}{\xi_1} r_3 \right] = [r'_1, r'_2, r'_3] \qquad \text{Equation (23)}$$

Therefore, knowing that $r'_1$, $r'_2$, $r'_3$ are orthogonal to each other, three linear constraints are derived for $B = K'^{-T} K^{-1}$, which has three unknowns. Consequently, given the three constraints and three unknowns, a solution K' can be extracted from B. Note that K'=K is also a solution, therefore, the recovered solution to this problem is the correct solution. Finally, from Equation (23) it can be seen that R'=R, leaving only $T_i$ being ambiguous.

2.8 Exempary Implementation Scenario:

The following paragraphs summarize the implementation of various tested embodiments of the Camera Calibrator that are intended to be understood in view of the preceding discussion.

Figure 3:
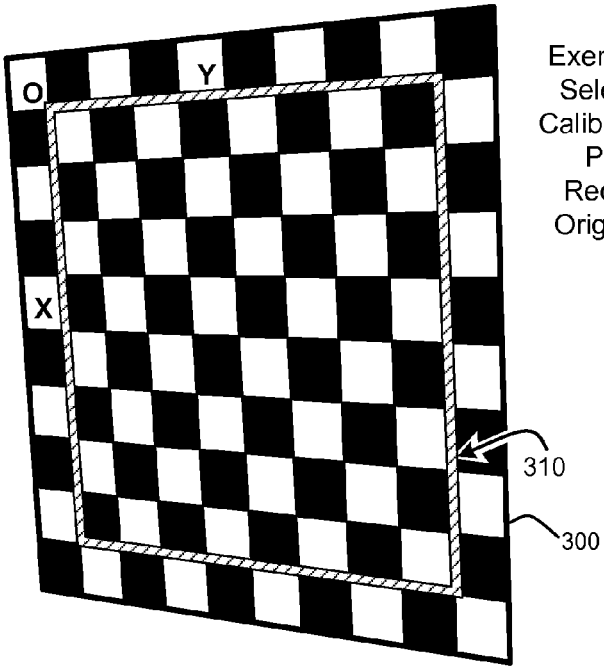
FIG. 3 provides an example of the selection of an input window or region in a skewed and transformed image of a regular geometric checkerboard type structure or pattern, as described herein.
Figure 3:
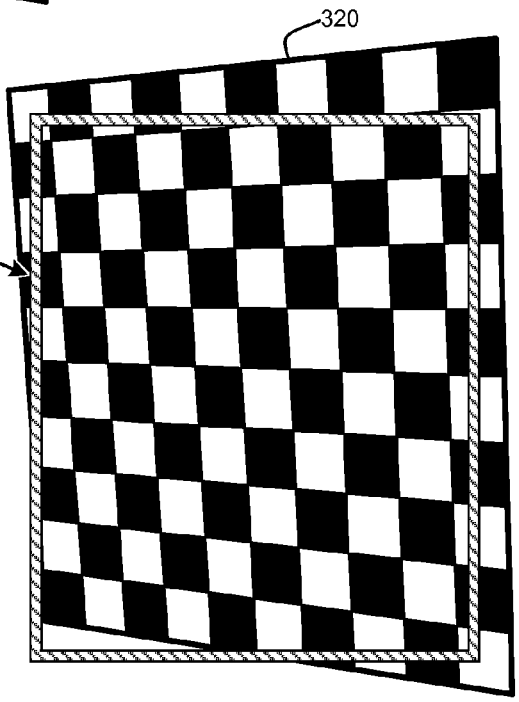

The initialization of the Camera Calibrator is extremely simple and flexible. In particular, as illustrated by FIG. 3 (discussed in further detail below), the location of the initial window (i.e., some region of each input image that is selected for processing by the Camera Calibrator) is either obtained from any desired segmentation method that is capable of at least approximately detecting the region of the pattern or structure in the image, or that region is simply selected via a user input (e.g., by designating some approximately rectangular region of the input image).

Advantageously, in contrast to conventional camera calibration techniques (see selected region 310 of FIG. 3, for example), there is no need for the location, axes, or origin of the initial window to be exact or even to fully cover the pattern region (see selected region 330 of FIG. 3, for example) in order for the Camera Calibrator to accurately converge precisely to the pattern, and thus the camera distortions and intrinsic and extrinsic parameters.

Given the selection or designation of the initial window in each image, whether automatically or bia user input, the Camera Calibrator first runs the TILT process on each initial window to approximately extract the homography $H_i$ for the ith image. Then, a rough estimate of K, R, T is obtained from the vanishing points given by the first two columns of $\tau_i$. Note that in view of the preceding discussion, it should be understood that the first two columns of $\tau_i$ correspond to the vertical and horizontal directions of the low-rank textures. Initial lens distortion parameters are set to zero, even if large lens distortions are present.

Further, in various embodiments, convergence speed of the Camera Calibrator is reduced by using multi-resolution enhancements to the TILT process. For example, as discussed with respect to the TILT process, to further improve both the speed and the range of convergence, in various embodiments, the TILT process optionally adapts a multi-resolution approach to the low-resolution texture extraction techniques. In general, these multi-resolution enhancements operate by building a pyramid of images by iteratively blurring and downsampling the input window (i.e., the selected region of the input image) to half the size until the size of the matrix reaches some preset threshold (e.g., about 30×30 pixels) to construct a hierarchical pyramid of downsampled images.

Then, starting from the top of the pyramid (lowest resolution), the TILT process is applied to the lowest-resolution image first, with the TILT process then moving down the pyramid to higher resolution images using the transform outputs from the prior level as the initialization for the current level of the pyramid. It has been observed that this multi-resolution technique significantly improves the range of convergence and robustness of the TILT process since in low-resolution images, small details are blurred out and only main structures of the image drive the updates of the deformations and transforms during texture extraction.

3.0 Exemplary Operating Environments

Figure 5:
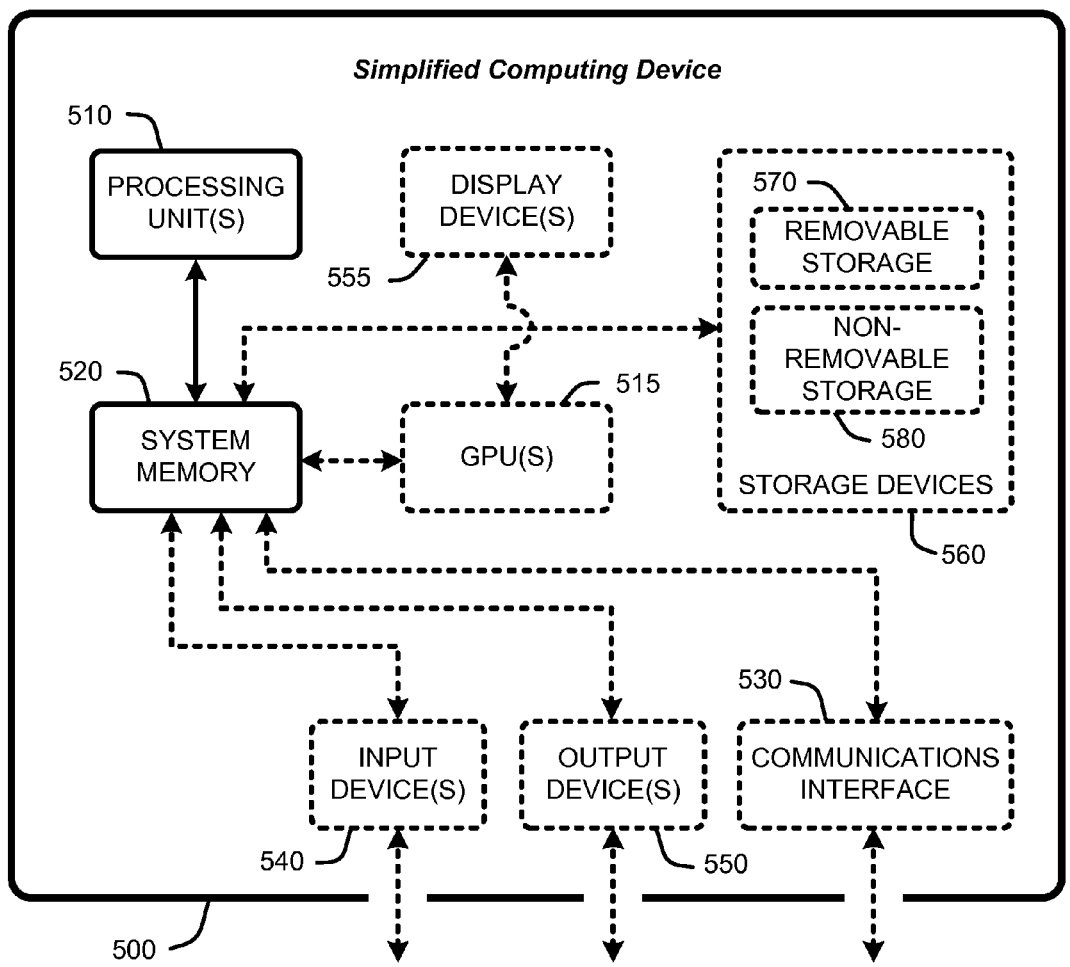
FIG. 5 is a general system diagram depicting a simplified general-purpose computing device having simplified computing and I/O capabilities for use in implementing various embodiments of the Camera Calibrator, as described herein.

The Camera Calibrator described herein is operational within numerous types of general purpose or special purpose computing system environments or configurations. FIG. 5 illustrates a simplified example of a general-purpose computer system on which various embodiments and elements of the Camera Calibrator, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device, i.e., computer 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Camera Calibrator, the device should have a sufficient computational capability and system memory to enable basic computational operations. In particular, as illustrated by FIG. 5, the computational capability of computer 500 is generally illustrated by one or more processing unit(s) 510, and may also include one or more GPUs 515, either or both in communication with system memory 520. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Camera Calibrator described herein, or portions thereof, may be stored, received, transmitted, or read from any desired combination of computer or machine readable media or storage devices and communication media in the form of computer executable instructions or other data structures.

Finally, the Camera Calibrator described herein may be further described in the general context of computer-executable instructions, such as program modules, being executed by a computing device. Generally, program modules include routines, programs, objects, components, data structures, etc., that perform particular tasks or implement particular abstract data types.

The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Camera Calibrator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Camera Calibrator. It is intended that the scope of the invention be limited not by this detailed description, but rather by the claims appended hereto.

What is claimed is:

1. A method for calibrating a camera, comprising using a computing device to perform steps for:
    receiving a single input image;
    windowing the input image into a plurality of windows;
    for each window of the input image, iteratively recovering a current low-rank texture from the input image by using an iterative convex optimization process to update a current geometric transformation and to find a low-rank texture relative to the current geometric transformation until local convergence of the geometric transformation is achieved;
    repeating the iterated steps for each window until global convergence of the geometric transformation is achieved; and
    wherein the input image includes a known pattern having known deformations, and wherein the current geometric transformation for each window of the input image is used in combination with the known deformations of the known pattern to calibrate a camera used to capture the input image.

2. The method of claim 1 wherein the current geometric transformation in combination with the known deformations are used to determine estimated lens distortions and intrinsic camera parameters that are used to calibrate the camera.

3. The method of claim 2 further comprising correcting distortions in one or more additional images captured by the camera based on the estimated lens distortions and intrinsic camera parameters.

4. The method of claim 2 wherein the intrinsic parameters of the camera include a focal length, skew, and a principal point of each input image.

5. The method of claim 2 further comprising
    estimating extrinsic parameters associated with the input image from two or more of the low-rank textures, and wherein the extrinsic parameters include one or more of rotation and translation of the input image image relative to the camera.

6. The method of claim 5 further comprising steps for rectifying the input image based on the estimated extrinsic parameters.

7. The method of claim 5 wherein the camera calibration is performed using the estimated lens distortions, the intrinsic camera parameters, and the extrinsic camera parameters.

8. The method of claim 1 wherein windowing the input image into a plurality of windows comprises selecting a region that each window to approximately correspond to a portion of the image that contains an arbitrary regular structure.

9. The method of claim 5 further comprising steps for rectifying one or more of the low-rank textures, and outputting the rectified low-rank textures as corrected versions of the corresponding windows of the input image.

10. The method of claim 1 wherein the known pattern having known deformations is an arbitrary regular structure.

11. A system, comprising:
    a general purpose computing device; and
    a computer program comprising program modules executable by the computing device, wherein the computing device is directed by the program modules of the computer program to:
    receive a single input image;
    windowing the input image into a plurality of windows;

for each window of the input image, iteratively recovering a current low-rank texture from the input image by using an iterative convex optimization process to update a current geometric transformation and to find a low-rank texture relative to the current geometric transformation until local convergence of the geometric transformation is achieved;

repeating the iterated steps for each window until global convergence of the geometric transformation is achieved; and wherein the input image includes a known pattern having known deformations, and wherein the current geometric transformation for each window of the input image is used in combination with the known deformations of the known pattern to calibrate a camera used to capture the input image.

12. The system of claim 11 wherein the camera calibration is performed using estimated lens distortions and intrinsic camera parameters determined from the combination of the geometric transformations and the known deformations.

13. The system of claim 12 wherein the computing device is further directed by the program modules to correct distortions in one or more additional images captured by the camera based on the estimated lens distortions and intrinsic camera parameters.

14. The system of claim 11 wherein the computing device is further directed by the program modules to rectify one or more input images based on extrinsic camera parameters estimated from low-rank textures recovered from two or more input images, said extrinsic parameters including one or more of rotation and translation of the images relative to the camera.

15. The system of claim 11 wherein windowing the input image into a plurality of windows comprises selecting each window to approximately correspond to a portion of the image that contains an arbitrary regular structure.

16. A computer-readable storage device having computer executable instructions stored therein, said instructions causing a computing device to execute a method comprising:

receiving a single input image;

windowing the input image into a plurality of windows;

for each window of the input image, iteratively recovering a current low-rank texture from the input image by using an iterative convex optimization process to update a current geometric transformation and to find a low-rank texture relative to the current geometric transformation until local convergence of the geometric transformation is achieved, and repeating the iterated recovery of low-rank textures for each window until global convergence of the geometric transformation is achieved; and wherein the input image includes a known pattern having known deformations, and wherein the current geometric transformation for each window of the input image is used in combination with the known deformations of the known pattern to calibrate a camera used to capture the input image.

17. The computer-readable storage device of claim 16 the camera calibration os performed using lens distortions and intrinsic camera parameters that are both estimated from the combination of geometric transformations and known deformations.

18. The computer-readable storage device of claim 17 further comprising instructions for correcting distortions in one or more additional images captured by the camera based on the estimated lens distortions and intrinsic camera parameters.

19. The computer-readable storage device of claim 16 further comprising instructions for rectifying one or more input images based on extrinsic camera parameters estimated from low-rank textures recovered from two or more input images.

20. The computer-readable storage device of claim 16 wherein windowing the input image into a plurality of windows comprises selecting each window to approximately correspond to a portion of the image that contains an arbitrary regular structure.

* * * * *